United States Patent
Steinman

(10) Patent No.: US 11,642,616 B2
(45) Date of Patent: May 9, 2023

(54) FILTER FOR IN-LINE OR INLET APPLICATIONS

(71) Applicant: Stoneridge, Inc., Novi, MI (US)

(72) Inventor: Robert J. Steinman, Lexington, OH (US)

(73) Assignee: STONERIDGE, INC., Novi, MI (US)

( * ) Notice: Subject to any disclaimer, the term of this patent is extended or adjusted under 35 U.S.C. 154(b) by 263 days.

(21) Appl. No.: 16/377,105

(22) Filed: Apr. 5, 2019

(65) Prior Publication Data

US 2019/0351356 A1   Nov. 21, 2019

Related U.S. Application Data

(60) Provisional application No. 62/653,709, filed on Apr. 6, 2018.

(51) Int. Cl.
   *B01D 46/00* (2022.01)
(52) U.S. Cl.
   CPC ..... *B01D 46/0005* (2013.01); *B01D 46/0004* (2013.01); *B01D 46/0012* (2013.01); *B01D 46/0045* (2013.01)
(58) Field of Classification Search
   CPC ............ B01D 46/0005; B01D 46/0004; B01D 46/0012; B01D 46/0045
   USPC ...... 55/385.3, 418, 312, 314, 319, 320, 321, 55/328, 340, 355, 413, 406, 396, 394, 55/419
   See application file for complete search history.

(56) References Cited

U.S. PATENT DOCUMENTS

| 3,013,667 A | 12/1961 | Jackson et al. |
| 3,959,137 A * | 5/1976 | Kirsgalvis ............ B01D 29/902 210/791 |
| 3,960,733 A | 6/1976 | Van Dieren |
| 9,333,451 B2 | 5/2016 | Lay et al. |
| 9,821,261 B2 | 11/2017 | Steinman |
| 2003/0066792 A1 | 4/2003 | Xia et al. |

(Continued)

FOREIGN PATENT DOCUMENTS

| CN | 106541935 | 3/2017 |
| CN | 106662263 | 5/2017 |

OTHER PUBLICATIONS

South Korean Notice of Preliminary Rejection dated Feb. 9, 2021 in corresponding South Korean Patent Application No. 10-2020-7031863, English translation attached.

(Continued)

*Primary Examiner* — Robert A Hopkins
*Assistant Examiner* — Qianping He
(74) *Attorney, Agent, or Firm* — Grossman, Tucker, Perreault & Pleger, PLLC

(57) ABSTRACT

A filter for in-line or inlet applications. The filter may include a spindle for supporting a filter element. In some embodiments, the spindle may be fixedly attached to a filter cap or filter body. The filter may be used as an in-line filter with a hose or tube on the inlet and outlet ports of the filter cap and filter body. In addition, or alternatively, a filter consistent with the present disclosure may be provided with a splash cap that allows use of the filter as a protected inlet for fluid flow. When used as an inlet filter, fluid may enter the filter through the splash cap and exit the filter through hose or tube coupled to the filter body. Both uses allow for serviceability.

15 Claims, 4 Drawing Sheets

(56) References Cited

U.S. PATENT DOCUMENTS

| | | | |
|---|---|---|---|
| 2009/0014381 A1* | 1/2009 | South | B01D 29/902 |
| | | | 210/418 |
| 2013/0255202 A1 | 10/2013 | Shamir et al. | |
| 2015/0260134 A1* | 9/2015 | Lay | B01D 46/2403 |
| | | | 55/385.3 |
| 2015/0369182 A1 | 12/2015 | Steinman | |
| 2018/0085690 A1* | 3/2018 | Chernov | C02F 1/003 |

OTHER PUBLICATIONS

International Search Report and Written Opinion dated Jun. 20, 2019 in corresponding PCT Patent Application No. PCT/US19/26184.

Chinese Office Action dated Apr. 9, 2021 in corresponding Chinese Patent Application No. 201980036306.3.

* cited by examiner

FILTER FOR IN-LINE OR INLET APPLICATIONS

CROSS-REFERENCE TO RELATED APPLICATIONS

The present application claims the benefit of the filing date of U.S. Provisional Application Ser. No. 62/653,709 filed Apr. 6, 2018, the teachings of which are hereby incorporated herein by reference.

TECHNICAL FIELD

This disclosure generally relates to filters, and, in particular, relates to a filter for in-line or inlet applications.

BACKGROUND

Filters are used in a wide variety of applications. An evaporative emission system of a vehicle, for example, is used to prevent gasoline vapors from escaping into the atmosphere from a fuel tank and fuel system. These systems have included one or more filters for blocking dust or other contaminants from entering the system. Examples of filters useful in an evaporative emission system are described in U.S. Pat. No. 9,821,261 (the '261 patent) and U.S. Pat. No. 9,333,451.

The '261 patent shows an example of an in-line filter. An in-line filter has inlet and outlet ports and is configured to be coupled to a system with separate conduits coupled to the inlet and outlet ports to filter fluid (e.g. air) flow that is in-line with the conduits. Another type of filter is an inlet filter. An inlet filter is configured to take ambient fluid into the filter without use of a separate conduit coupled to an inlet port of the filter and pass filtered fluid out through an outlet port.

Previous filter designs included a spindle for supporting a filter element (foam, woven material, etc.) as a separate component. As a separate component, the spindle added cost and complexity to the design and led to concerns that the spindle could be lost or damaged during field servicing. Also, previous filter designs used as in-line filters could not be easily reconfigured for use as an inlet filter, e.g. for an evaporative emissions system, due to the absence of a reliable and effective feature for protecting against water ingress.

BRIEF DESCRIPTION OF THE DRAWINGS

Select examples of variations within the scope of the present disclosure will become more fully understood from the detailed description and the accompanying drawings, wherein.

DETAILED DESCRIPTION

The following description of the variations is merely illustrative in nature and is in no way intended to limit the scope of the present disclosure, its application, or uses.

In some embodiments of a filter consistent with the present disclosure, the spindle feature that supports a filter element may be combined with the filter cap or the filter body so that it is fixedly attached to the filter cap or the filter body. In some embodiments, for example, the filter element may be molded with the filter cap or filter body to form a single part, or a separate filter element may be fixedly attached, e.g. by co-molding, ultrasonic welding, etc., with the filter cap or filter body. The filter may be used as an in-line filter with conduits, e.g. a hose or tube, on the inlet and outlet ports of the filter cap and filter body. In addition, or alternatively, a filter consistent with the present disclosure may be provided with a splash cap that allows use of the filter as a protected inlet filter. When used as an inlet filter, air or other fluid may enter the filter through the splash cap and exit the filter through hose or tube coupled to an outlet port on the filter body. Both uses allow for serviceability.

Figure 1:
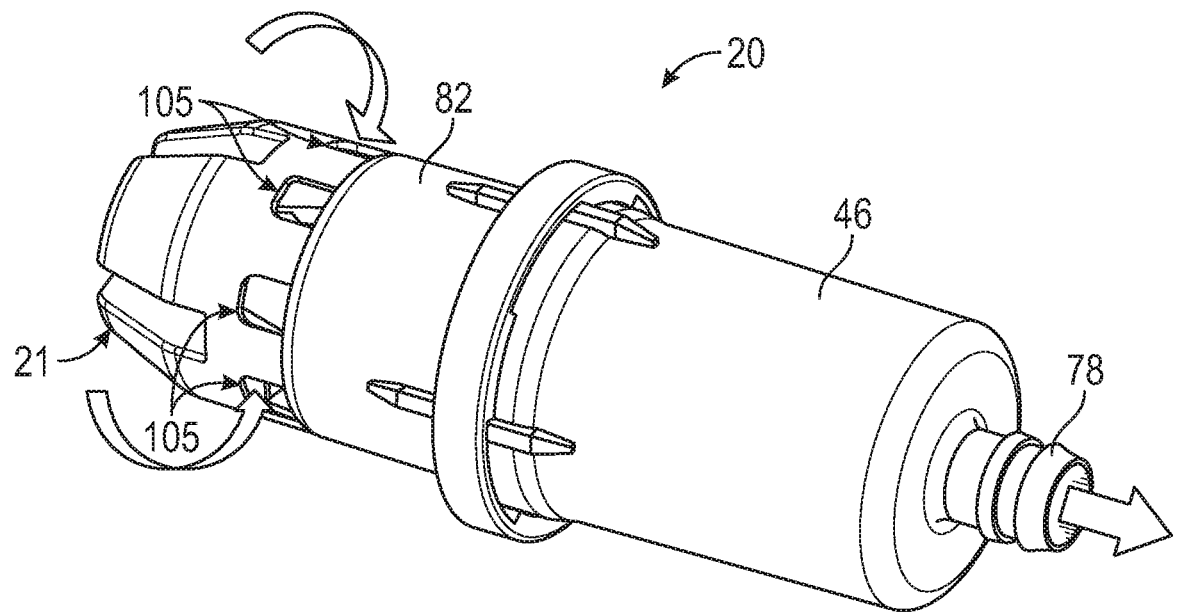
FIG. 1 illustrates a perspective view of a filter consistent with the present disclosure.
Figure 2:
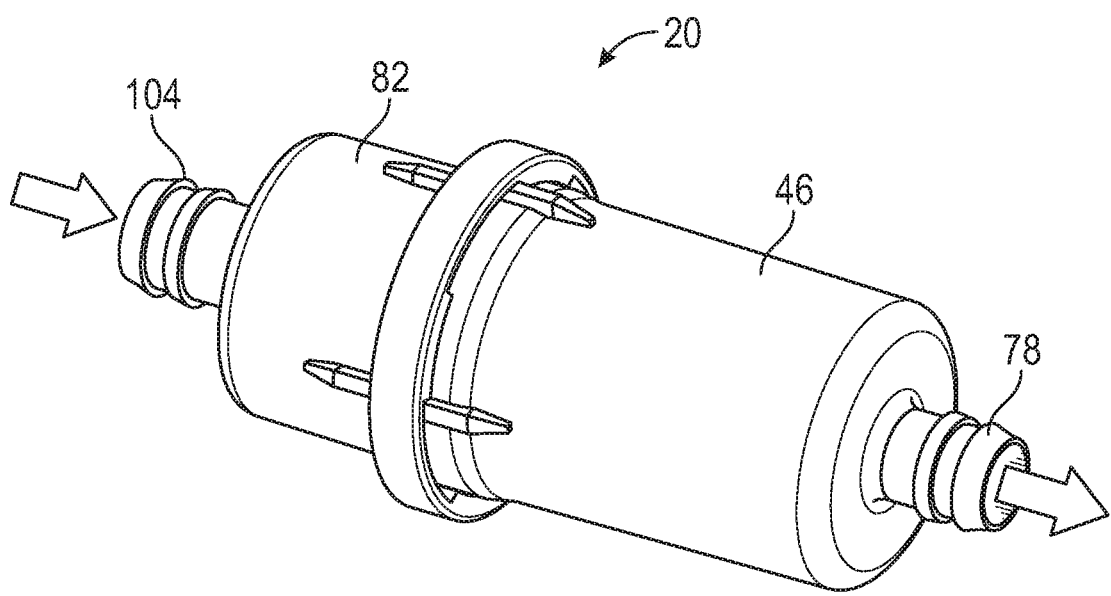
FIG. 2 illustrates another embodiment of a filter consistent with the present disclosure.

FIG. 1 illustrates a filter 20 consistent with the present disclosure including a splash cap 21 and configured for use as an inlet filter, and FIG. 2 illustrates as the filter 20 configured for use as an in-line filter. With reference also to the sectional views of FIGS. 3 and 4, the filter 20 includes a filter body 46, an O-ring 98, and a filter cap 82. In general, inlet fluid (indicated by arrows in FIGS. 1 and 2), such as air, either flows into the filter 20 through splash cap inlet ports 105 and then into a filter cap inlet port 104 when the splash cap 21 is used with the filter 20, as shown in FIG. 1, or flows directly into the filter cap inlet port 104 when the splash cap 21 is not used with the filter 20, as shown in FIG. 2. The filter 20 filters dust and/or other contaminants from the inlet fluid and provides filtered output fluid (indicated by arrows in FIGS. 1 and 2) through an output port 78. The filter 20 may allow dust and/or other contaminants to be dumped out of the filter 20 periodically so that the filter 20 may be reused numerous times which may increase the life of the filter 20 and/or the fuel system canister 112, as will be discussed below.

While an automotive vehicle fuel system 108 is illustrated and described herein for exemplary purposes, it should be recognized that the filter 20, with or without the splash cap 21, may be used to protect any number of vehicle fuel systems including, but not limited to, tractors, dirt bike, lawn mower and/or general lawn equipment, four-wheelers, recreational vehicle systems, marine vehicles, train systems and/or aircraft. The filter 20 may also be used for in an engine air intake system and/or in a cooling air system for any number of electric motors. Also, although the filter 20 may be described herein with respect to filtering of gaseous fluid such as air, a filter consistent with the present disclosure may also, or alternatively, be configured to filter other liquids including, for example, water, engine coolant, etc. The filter 20 may also be implemented into non-vehicle applications, e.g. in a heating, ventilation and cooling system, or other fluid, such as a pond filter.

In the illustrated example embodiments, a spindle 24 for receiving a filter element 38 is combined with the filter cap 82 so that it is fixedly attached to the filter cap 82 or the filter body 46. When the filter 20 is assembled, the filter body 46 and the filter cap 42 enclose the spindle 24 and the filter element 38. The term "fixedly attached" as used herein to describe the connection between the spindle 24 and the filter cap 82 or the filter body 46 refers to a connection between the spindle 24 and the filter cap 82 or the filter body 46 that resists separation between the elements so that the spindle 24 does not easily separate from the filter cap 82 or the filter body 46 during assembly or disassembly. For example, the spindle 24 may be fixedly attached to the filter cap 82 or the filter body 46 by being molded from a polymeric material as an integral single part with the filter cap 82 or the filter body 46. Alternatively, the spindle 24 may be constructed from a separate material from the filter cap 82 or the filter body 46 and co-molded with the filter cap 82 or the filter body 46. Other methods for fixedly attaching the spindle 24 to the filter cap 82 or the filter body 46, such as welding, ultrasonic welding, fastener connections, press-fit connections, etc., will be known to those of ordinary skill in the art. For ease of explanation example embodiments of a filter 20 consistent with the present disclosure will be described herein with a spindle 24 combined with the filter cap. It is to be understood, however, that the spindle 24 may be combined with the filter body 46 instead of the filter cap 82.

The spindle 24 has a first end 28, and a second end 30 and may be any number of shapes including, but not limited to cylindrical. The spindle 24 may be hollow and may act as a flow passage for fluid that may travel therethrough. The spindle 24 may include one or more slots 32 which may be constructed and arranged to allow a fluid flow to travel through the filter element 38 and into a center tunnel 64. The filter element 38 may be assembled onto the spindle 24 so that the filter element surrounds at least a portion of the spindle. In some embodiments, for example, the filter element 38 may be have a cylindrical shape with a central opening for receiving the spindle 24. The filter element 38 may include any number of materials including, but not limited to, any number of foams, pleated woven plastic, woven fibers, non-woven fibers, screens, and/or pleated paper.

The spindle 24 of the filter cap 82 may be placed inside of the filter body 46. The filter body 46 may include a cup component 48, a center tunnel 64, one or more collection chambers 76, and an outlet port 78. The cup component 48 may include a base 50 and a body structure 52. The cup component 48 may be any number of shapes including, but not limited to, cylindrical. A lip 54 may extend radially outward from the perimeter of a first end 56 of the body structure 52. The lip 54 may also include one or more locking features including, but not limited to twist lock tabs which may be constructed and arranged to mate and lock with a filter cap 82 locking feature 96.

A through-hole 62 may extend through the base 50 of the cup component 48 so that fluid may exit the filter body 46 through the outlet port 78. The center tunnel 64 may extend a distance from the perimeter of the through-hole 62 in the base 50 of the cup component 48 and may act as a flow passage for fluid which may be traveling through the filter 20. A first end 66 of the center tunnel 64 may be constructed and arranged to mate with a second end 30 of the spindle 24.

A plurality of chamber walls 70 may extend from the center tunnel 64 to the body structure 52. The chamber walls 70 may each include an upper portion 72 and a lower portion 74. The lower portion 74 of the chamber walls 70 may be constructed and arranged to form one or more dust/contaminant collection chambers 76. The upper portion 72 may be constructed and arranged to provide a lead-in angle for installation of the spindle 24. The upper portion 72 may also be constructed and arranged to assist in centering the spindle 24 in the filter body 46. The upper portion 72 may gradually taper inward.

The outlet port 78 may extend from the perimeter of the through-hole 62 on the base 50 of the cup component 48. The outlet port 78 may be any number of shapes including, but not limited to, cylindrical and may include one or more locking features 80 which may include, but are not limited to, one or more locking tabs. The outlet port 78 may be constructed and arranged to operatively connect with any number of conduits, e.g. hoses or tubes associated with vehicle components including, but not limited to, a fresh air line or canister vent solenoid (CVS). The filter body 46 may include any number of materials including, but not limited to, one or more polymeric materials.

The filter cap 82 may include a cap structure 84, a plurality of vanes 100, and a filter cap inlet port 104. The cap structure 84 may include a top component 86 and a body component 88. A through-hole 90 may extend through the top component 86 and may be constructed and arranged to allow fluid into the filter 20. The body component 88 may be any number of shapes including, but not limited to, cylindrical. The locking feature 96 may extend radially from the perimeter of the body component 88. The locking feature 96 may also be constructed and arranged to house the O-ring 98. The O-ring 98 may help to ensure that the filter cap 82 and filter body 46 are properly sealed together with little to no gaps which may further prevent dust and/or other contaminants from exiting the filter 20. The O-ring 98 may include any number of materials including, but not limited to, an elastomeric material.

The locking feature 96 may be any variation of locking features including, but not limited to, a twist lock feature wherein when the filter cap 82 may be placed on top of the filter body 46 and twisted or rotated in a first direction, to lock the filter cap 82 and the filter body 46 together. The filter cap 82 and filter body 46 may make a locking or snapping noise which may indicate to an operator that the filter cap 82 is properly locked onto the filter body 46. An operator may also be able to visually see that the filter cap 82 is properly locked onto the filter body 46. The locking feature 96 may also be tactile so that an operator may feel when the filter cap 82 properly locks onto the filter body 46. This may ensure that the serviceable filter 20 is properly locked into place during assembly or during maintenance. The filter cap 82 and filter body 46 may be unlocked by twisting and/or rotating the filter cap 82 in the opposite direction. In another variation, the filter cap 82 and the filter body 46 may be bonded together, for example but not limited to, welding, however, the filter 20 may then be a single use filter.

The vanes 100 may be spiral vanes and may extend from an inner surface 102 of the top component 86 and may be constructed and arranged to accommodate a first end 28 of the spindle 24. The plurality of vanes 100 may be constructed and arranged to increase a surface area of the fluid flow which may assist in capturing finer dust and/or other contaminants including, but not limited to, mist, as will be discussed below.

The filter cap inlet port 104 may extend upward from the perimeter of the through-hole 90 extending through the top component 86 of the cap structure 84. The filter cap inlet port 104 may include one or more locking features 106 which may include, but are not limited to, one or more locking tabs. The filter cap inlet port 104 may be constructed and arranged to operatively connect with any number of vehicle components including, but not limited to, a pre-filter or an outside fluid source.

The splash cap 21 may include a cap structure 85, and one or more splash cap inlet ports 105. The cap structure 85 may include a top component 87 and a body component 89. The body component 89 may include a first end 93 and a second end 95 and may be any number of shapes. Walls of the body component 89 extend from the top component 87 and form a receptacle 91 for the filter cap inlet port 104 of the filter cap 82. The receptacle 91 may be constructed and arranged to provide a lead-in angle for installation of the filter cap inlet port 104 whereby an opening defined by the receptacle 91 tapers from the first end 93 to a second end 95. The receptacle 91 may also assist in centering the splash cap 21 on the filter cap inlet port 104.

A locking feature 97 may extend radially inward from walls of the body component 89 at the first end of the receptacle 91. The locking feature 97 may be any variation of locking features including, but not limited to, a snap lock feature wherein when the splash cap 21 may be placed on top filter cap 82 and pushed in a first direction, locking features may lock the splash cap onto the filter cap through engagement with the locking features on the filer cap inlet port 104 of the filter cap 82. The splash cap 21 and the filter cap 82 may make a locking or snapping noise which may indicate to an operator that the splash cap 21 is properly locked onto the filter cap 82. An operator may also be able to visually see that the splash cap 21 is properly locked onto the filter cap 82. The locking feature 97 may also be tactile so that an operator may feel when the splash cap 21 is properly locked onto the filter cap 82. The splash cap 21 and the filter cap 82 may be unlocked by twisting, pulling and/or rotating the splash cap 21 and filter cap 82 in opposite directions. In another variation, the splash cap 21 and filter cap 82 may be bonded together, for example but not limited to, welding, however, the filter 20 may then be a single use filter.

The splash cap inlet ports 105 may be configured as through holes that extend through the body component 89 at the second end 93 and may be constructed and arranged to allow fluid flow into the filter cap inlet port 104 of the filter cap 82. As illustrated by arrows in FIG. 3, for example, fluid may enter the splash cap inlet port(s) 105 and travel from the second end 95 of the splash cap 21 toward the first end 95 of the splash cap 21 and the top portion 87 and then through the receptacle 91 and into the filter cap inlet port 104 of the filter cap 82. This configuration prevents ingress of water into the filter cap inlet port 104 of the filer cap 82.

Figure 3:
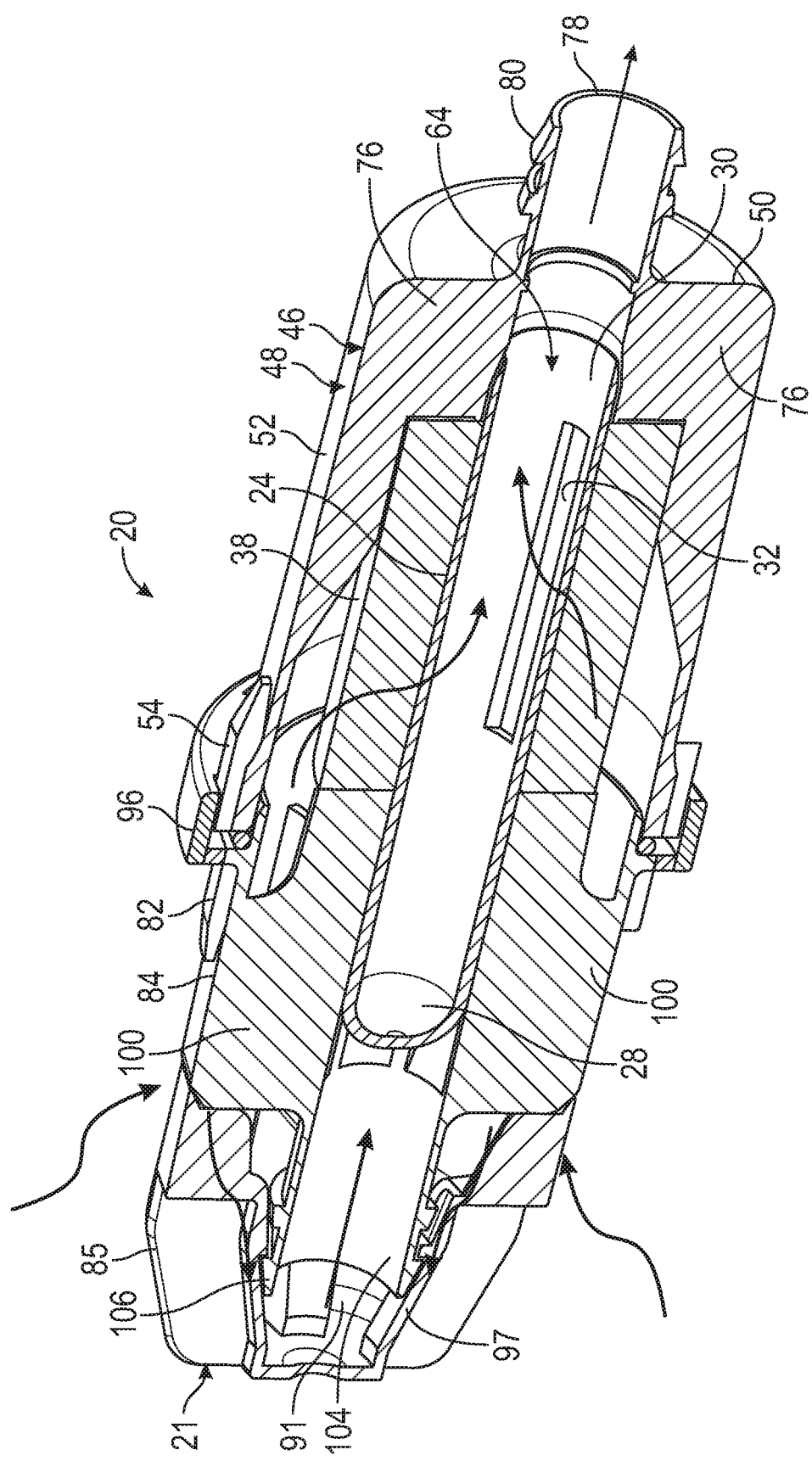
FIG. 3 illustrates a perspective sectional view of a filter consistent with the present disclosure.
Figure 4:
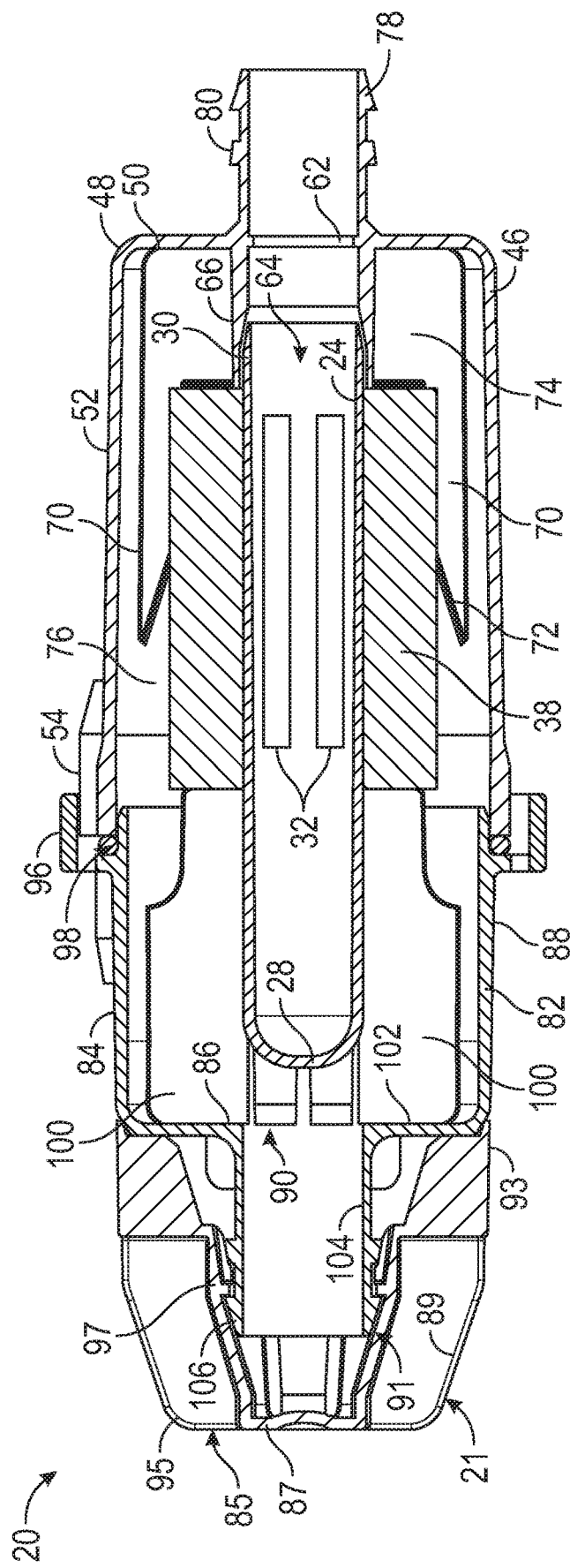
FIG. 4 is a side sectional view of a filter consistent with the present disclosure.

With continued reference to the arrows in FIG. 3, inlet fluid (e.g. air) including dust and/or other contaminants may enter into the filter cap inlet port 104 of the serviceable filter 20, either through the splash cap inlet ports 105 when the splash cap is used with the filter 20, or directly through the filter cap inlet port 104 when the splash cap is not used with the filter 20. As indicated by the arrow in FIG. 3, the inlet fluid, dust, and/or any number of contaminants may then travel through the vanes 100 in the filter cap 82 and into the filter element 38 assembled on the spindle 24. The vanes 100 may be constructed and arranged to increase the surface area for capturing finer dust and/or other contaminants including, but not limited to, mist.

The filter 20 may be designed so that the dust and/or other contaminants have an increased velocity at the vanes 100 and a decreased velocity as they pass through the filter element 38 which may cause the courser dust and/or other contaminant elements to drop out of the flow path 110 and into the dust/contamination collection chambers 76 of the filter body 46, and wherein the finer dust and/or other contaminant elements adhere to the filter element 38. Dust/contaminants that accumulate in the dust/contaminant collection chamber 76 and the filter element may then be removed during servicing. This may eliminate or reduce the need to replace the entire filter and/or the entire evaporative emission system including the fuel system canister 112.

Figure 5:
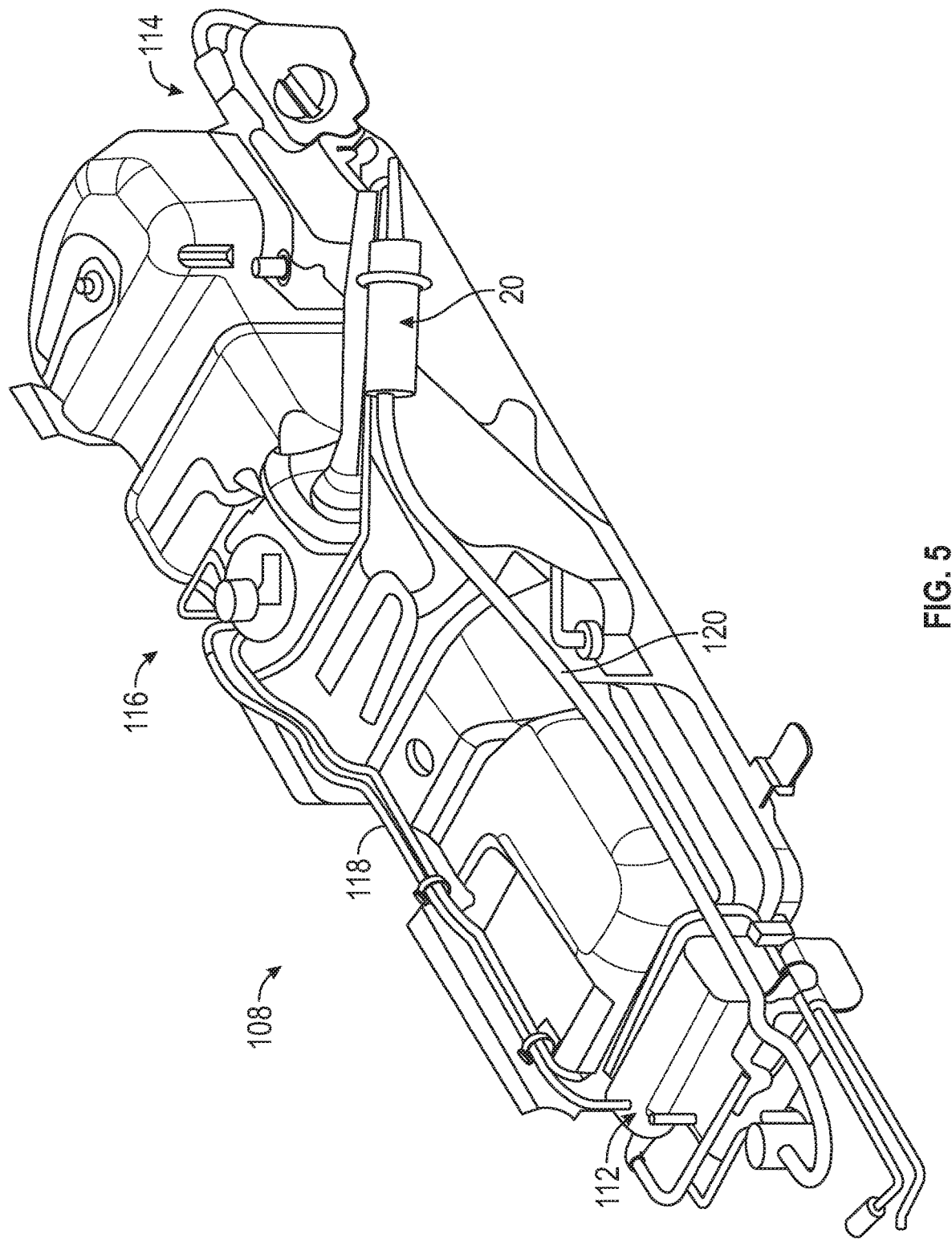
FIG. 5 illustrates a perspective view of a serviceable filter consistent with the present disclosure in a fuel system.

Referring to FIG. 5, the filter 20 may be compact and may be attached in various configurations and locations in a vehicle to protect the vehicle's fuel system 108 from dust and/or other contaminants. The filter 20 may be designed so that it may function in a vertical and/or horizontal position or any position there between. In one variation, the filter 20 may be attached onto the fresh air line between the CVS and the pre-filter 114 or the outside environment. The serviceable filter 20 may be added or removed to an evaporative emission system that may previously exist in a vehicle or may be implemented into a vehicle as the sole dust protection for various systems.

During refueling of the vehicle, the air flow may be reversed while fuel is entering into the vehicle tank 116. This may cause the fuel vapor in the tank 116 to be displaced by the fuel volume which may cause the fuel vapor to move from the tank 116 through a first tube or pipe 118 to the canister 112, which may include any number of materials including, but not limited to, a carbon, and again through a second tube or pipe 120 to the serviceable filter 20. The canister 112 may be designed to remove fuel vapor. The reverse flow may dislodge a portion of dust/contaminant from the filter element 38. The dislodged dust/contaminants may then be recaptured by the filter element 38 when the air flow returns to its normal operating state which may occur when the vehicle may be running. The normal operating state may be used to remove any captured fuel vapor which may be in the canister 112 and may meter the vapor into the engine air intake. Therefore, the filter 20 may function as a part of the path for fuel tank air to be released to the atmosphere during refueling.

In a number of variations, various filters 20 may include different configurations for higher efficiency situations or moderate efficiency situations depending on a customer's vehicle dust/contaminant exposure. Therefore, a customer may easily replace the filter 20 in a vehicle if the customer's dust/contaminant exposure increases or decreases.

According to one aspect of the present disclosure there is provided a filter including: a filter body; and a filter cap, wherein the filter cap attaches to the filter body, at least one of the filter body or the filter cap comprising a spindle fixedly attached thereto, the spindle having a filter element surrounding at least a portion thereof, wherein the filter body and the filter cap enclose the spindle and the filter element; wherein the filter cap comprises a filter cap inlet port for receiving inlet fluid and the filter body comprises an outlet port for providing output fluid.

According to another aspect of the present disclosure there is provided a filter comprising: a filter body comprising an output port for providing output fluid; a filter cap, the filter cap comprising a filter cap inlet port for receiving inlet fluid and being configured to attach to the filter body, a filter element enclosed by the filter body and the filter cap and disposed between the input port and the output port for filtering the inlet fluid to provide the output fluid; and a splash cap, the splash cap including a body portion defining a receptacle for receiving the inlet port, the splash cap further comprising at least one splash cap inlet port for receiving the filter cap inlet port at a first end of the splash cap, the splash cap being configured to direct the inlet fluid toward a second end of the splash cap and through the receptacle into the filter cap inlet port. In this aspect, the spindle may, or may not, be fixedly attached to the filter cap or the filter body.

According to another aspect of the present disclosure there is provided a method of constructing a filter including: fixedly attaching a spindle to one of a filter body or a filter cap, the filter body comprising an output port for providing output fluid, and the filter cap comprising a filter cap inlet port for receiving inlet fluid and being configured to attach to the filter body; assembling a filter element on the spindle; and enclosing the filter element between the filter body and the filter cap with the filter element disposed between the filter cap input port and the output port for filtering the inlet fluid to provide the output fluid.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

What is claimed is:

1. A filter comprising:
a filter body; and
a filter cap, wherein the filter cap attaches to the filter body,
at least one of the filter body or the filter cap comprising a spindle fixedly attached thereto and extending along a longitudinal axis of the filter, the spindle having a filter element surrounding at least a portion thereof, wherein the filter body and the filter cap enclose the spindle and the filter element;
wherein the filter cap comprises a filter cap inlet port for receiving inlet fluid and the filter body comprises an outlet port for providing output fluid; and
a splash cap configured to be removably coupled to the filter cap, the splash cap including a body portion having a first end and a second opposite end both extending along the longitudinal axis, the body portion defining a receptacle having an opening at the first end for receiving the filter cap inlet port along the longitudinal axis, the first end further comprising at least one splash cap inlet port configured to direct the inlet fluid toward the second end and then through the receptacle into the filter cap inlet port.

2. A filter according to claim 1, wherein the receptacle is configured to removably interlock with a locking feature on the filter cap inlet port.

3. A filter according to claim 1, wherein the outlet port is configured to connect to a vehicle component.

4. A filter according to claim 3, wherein the vehicle component is at least one of a fresh air line or a canister vent solenoid (CVS) of a vehicle.

5. A filter according to claim 1, wherein the filter cap inlet port is configured to connect to a vehicle component.

6. A filter according to claim 5, wherein the vehicle component is at least one of a fresh air line or a canister vent solenoid (CVS) of a vehicle.

7. A filter according to claim 1, wherein the filter cap, the spindle, and the filter body direct flow of the inlet fluid, wherein first contaminants in the inlet fluid adhere to the filter element and second contaminants drop into at least one contaminant collection chamber in the filter body, the first contaminants beings finer than the second contaminants.

8. A filter comprising:
a filter body comprising an output port for providing output fluid;
a filter cap, the filter cap comprising a filter cap inlet port for receiving inlet fluid and being configured to attach to the filter body,
a filter element enclosed by the filter body and the filter cap and disposed between the filter cap inlet port and the output port for filtering the inlet fluid to provide the output fluid; and
a splash cap, the splash cap including a body portion having a first end and a second end generally opposite the first end, the body portion defining a receptacle having an opening at the first end configured to receive the filter cap inlet port, the splash cap further comprising at least one splash cap inlet port for receiving the inlet fluid at the first end, the splash cap being configured to direct the inlet fluid toward the second end and then through the receptacle into the filter cap inlet port.

9. A filter according to claim 8, wherein the filter element is disposed on a spindle fixedly attached to one of the filter body or the filter cap.

10. A filter according to claim 8, wherein the receptacle is configured to removably interlock with a locking feature on the filter cap inlet port.

11. A filter according to claim 8, wherein the output port is configured to connect to a vehicle component.

12. A filter according to claim 11, wherein the vehicle component is at least one of a fresh air line or a canister vent solenoid (CVS) of a vehicle.

13. A filter according to claim 8, wherein the filter cap inlet port is configured to connect to a vehicle component.

14. A filter according to claim 13, wherein the vehicle component is at least one of a fresh air line or a canister vent solenoid (CVS) of a vehicle.

15. A filter according to claim 8, wherein the filter cap, the spindle, and the filter body direct flow of the inlet fluid, wherein first contaminants in the inlet fluid adhere to the filter element and second contaminants drop into at least one contaminant collection chamber in the filter body, the first contaminants beings finer than the second contaminants.

\* \* \* \* \*